United States Patent [19]

Takezawa et al.

[11] Patent Number: 5,173,997
[45] Date of Patent: Dec. 29, 1992

[54] TONGUE PLATE STOPPER

[75] Inventors: Hiroshi Takezawa; Ichiro Nakagawa; Masahiro Tanabe; Masanaga Tsuchikawa, all of Shiga, Japan

[73] Assignee: Takata Corporation, Tokyo, Japan

[21] Appl. No.: 810,131

[22] Filed: Dec. 19, 1991

[30] Foreign Application Priority Data

Jan. 17, 1991 [JP] Japan ................................ 3-003783

[51] Int. Cl.⁵ .............................................. A44B 17/00
[52] U.S. Cl. .................................. 24/114.5; 24/90 R; 24/104
[58] Field of Search ............... 24/114.5, 90 R, 90 C, 24/93, 103, 104, 112

[56] References Cited

U.S. PATENT DOCUMENTS

| | | | |
|---|---|---|---|
| 841,843 | 1/1907 | Anderson | 24/114.5 |
| 947,992 | 2/1910 | Jegge | 24/114.5 |
| 1,690,561 | 11/1928 | Sturton | 24/90 R |
| 2,521,192 | 9/1950 | Tessmann | 24/114.5 |
| 3,735,447 | 5/1973 | Abraham | 24/90 R |
| 4,101,170 | 7/1978 | Mori et al. | 24/114.5 |
| 4,785,508 | 11/1988 | Takeda | 24/90 C |
| 4,982,480 | 1/1991 | Kasai | 24/104 |

FOREIGN PATENT DOCUMENTS

| | | |
|---|---|---|
| 7531666 | 9/1976 | Fed. Rep. of Germany . |
| 5623147 | 7/1954 | Japan . |
| 2077342 | 12/1981 | United Kingdom . |
| 2190130 | 11/1987 | United Kingdom . |

Primary Examiner—Victor N. Sakran
Attorney, Agent, or Firm—Kanesaka and Takeuchi

[57] ABSTRACT

A tongue plate stopper has a first disc having its webbing side face formed with at least one needle to be inserted through a webbing; and a second disc having a fitting portion for fitting the needle therein. At least one of the first and second discs has its webbing side face formed with a plurality of pins for biting into the webbing. The needle of the first disc projects from the central portion thereof. The fitting portion of the second disc has a hole. The pins include a first set of pins projecting from the circumferential edge of the back face thereof and at a circumferential spacing from one another, and a second set of pins projecting from the middle portion between the needle and the circumferential edge and at a circumferential spacing from one another. The second disc has its webbing side face formed with a first circumferential groove, which extends in the circumferential direction at a radius substantially equal to that of the first set of pins, and a second circumferential groove which extend in the circumferential direction at a radius substantially equal to that of the second set of pins, so that the first set of pins can have their tips engaging with the first circumferential groove whereas the second set of pins can have their tips engaging with the second circumferential groove.

4 Claims, 2 Drawing Sheets

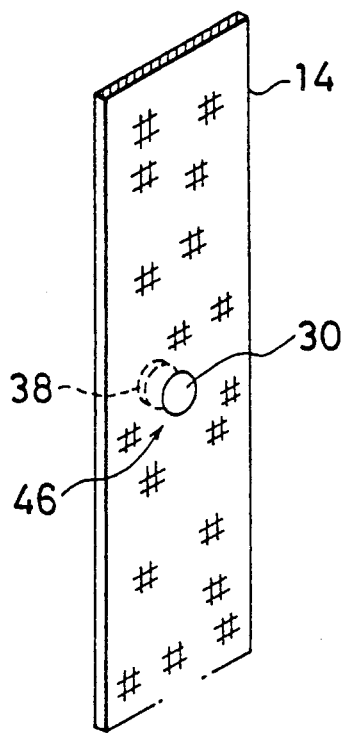
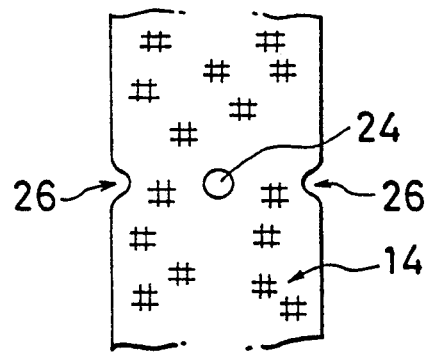
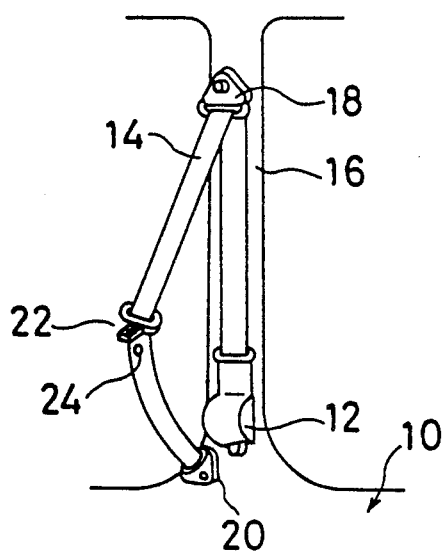

TONGUE PLATE STOPPER

BACKGROUND OF THE INVENTION

1. Field of the Invention

The present invention relates to a tongue plate stopper to be attached to a webbing of a seat belt and, more particularly, to a tongue plate stopper improved to have a high strength of attachment to the webbing and to have a reduced deformation of the webbing when it is attached to the webbing.

2. Description of the Prior Art

A seat belt system is composed, as shown in FIG. 6, of: a retractor 12 attached to a car body 10; a webbing 14 capable of being withdrawn from the retractor 12; a webbing retainer 18 attached to a center pillar 16; a tongue plate 22 by which the webbing 14 is guided to move; and a buckle (although not shown) into which the tongue plate 22 is inserted. The webbing 14 is equipped with a tongue plate stopper 24 for preventing the tongue plate 22 from sliding down when an occupant is not restrained, as shown.

The tongue plate 24 is exemplified in the prior art, which comprises a first disc having one needle projected from the center thereof and a second disc having a hole or recess for fitting the needle therein, as disclosed in Japanese Utility Model Laid-Open No. 23147/1981 or West German Utility Model No. 7531666. This tongue plate stopper is fixed to the webbing by fitting the needle in the hole or recess.

West German Utility Model No. 7531666 has also disclosed another structure, in which a first disc having a plurality of needles is fitted in a second disc by inserting the individual needles through the webbing into the second disc.

Since the weight of the tongue plate to be applied to the tongue plate stopper is wholly concentrated at the needle or needles, concentration of load occurs in the webbing wefts running crosswise below the needle or needles. As a result, the wefts are exclusively tensed to establish the "constrictions" 26 at the sides of the webbing 14, as shown in FIG. 7.

Moreover, the tongue plate stopper of the prior art is retained in the webbing by a small number of needles. Thus, there arises a problem that the strength of attachment of the tongue plate stopper to the webbing, namely, the retaining strength in the longitudinal direction of the webbing is low.

OBJECT AND SUMMARY OF THE INVENTION

The present invention has an object to a tongue plate stopper which can prevent the above-specified "constrictions" of the webbing.

Another object of the present invention is to provide a tongue plate stopper which has a high strength of attachment to the webbing.

According to a first mode of the present invention, there is provided a tongue plate stopper which comprises: a first disc having its webbing side face formed with at least one needle to be inserted through a webbing; and a second disc having a fitting portion for fitting the needle therein, wherein the improvement resides in that at least one of the first and second discs has its webbing side face formed with a plurality of pins for biting into the webbing.

According to a second mode of the present invention, there is provided a tongue plate stopper according to the first mode, wherein the plurality of pins are formed to project from the back face of the one disc and at a predetermined pitch, and wherein the other of the discs has its webbing side face formed with a groove which is shaped and sized to engage with the tips of the pins.

According to a third mode of the present invention, there is provided a tongue plate stopper according to the first mode, wherein the needle of the first disc projects from the central portion thereof, wherein the fitting portion of the second disc has a hole, wherein the pins include a first set of pins projecting from the circumferential edge of the back face thereof and at a circumferential spacing from one another, and a second set of pins projecting from the middle portion between the needle and the circumferential edge and at a circumferential spacing from one another, and wherein the second disc has its webbing side face formed with a first circumferential groove, which extends in the circumferential direction at a radius substantially equal to that of the first set of pins, and a second circumferential groove which extends in the circumferential direction at a radius substantially equal to that of the second set of pins, so that the first set of pins can have their tips engaging with the first circumferential groove whereas the second set of pins can have their tips engaging with the second circumferential groove.

In the tongue plate stopper of the first mode, the plurality of pins bites like pawls into the webbing so that the weight of the tongue plate to be applied to the tongue plate stopper is not concentrated at the needle but dispersed among all the pins. As a result, the load to be applied to the wefts running below the needle is reduced to prevent the "constrictions" of the webbing. Since, moreover, the numerous pins bit like the pawls into the webbing, they can remarkably enhance the strength of attachment of the tongue plate stopper to the webbing, especially the retaining strength in the longitudinal direction of the webbing.

In order to ensure this operational effect, five or more, e.g., ten to twenty pins may preferably be formed on the disc of the tongue plate stopper.

In the tongue plate stopper of the second mode, the plurality of pins are arranged at the predetermined spacing and have their tips engaging with the groove so that the strength of the tongue plate stopper to the webbing can be remarkably enhanced.

In the tongue plate stopper of the third mode, the first and second sets of pins are individually arranged annularly in the circumferential directions so that the first pins have their tips engaging with the first circumferential groove whereas the second pins have their tips engaging with the second circumferential groove. Thus, the strength of the tongue plate stopper to the webbing can be additionally enhanced.

BRIEF DESCRIPTION OF THE DRAWINGS

FIG. 5 is a perspective view showing a state in which a tongue plate stopper according to an embodiment is attached to a webbing;

FIG. 6 is a perspective view showing a seat belt system; and

FIG. 7 is a front elevation showing a state in which the tongue plate stopper of the prior art is attached to the webbing.

DESCRIPTION OF THE PREFERRED EMBODIMENT

Figure 1:
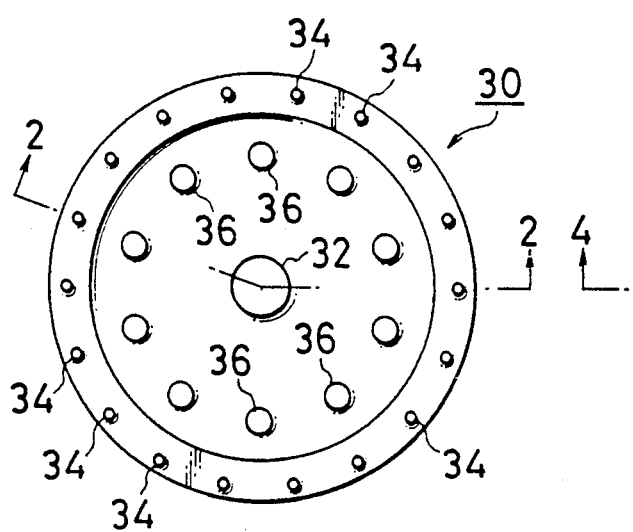
FIG. 1 is a top plan view showing a first disc.
Figure 3:
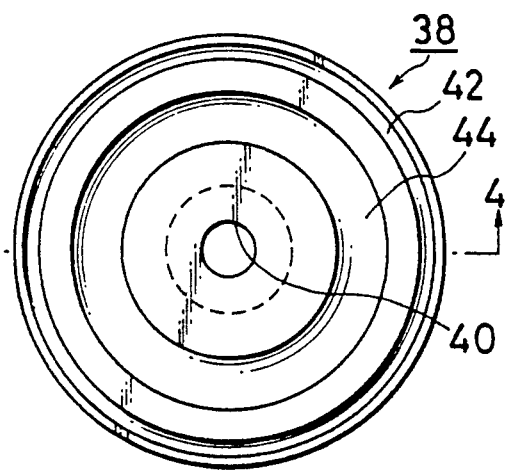
FIG. 3 is a top plan view showing a second disc.
Figure 2:
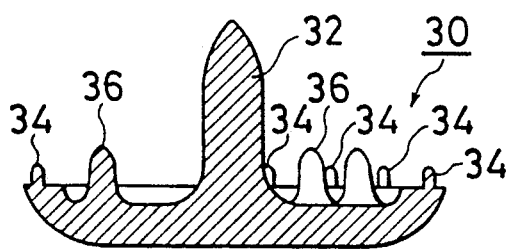
FIG. 2 is a section taken along line 2—2 of FIG. 1.
Figure 4:
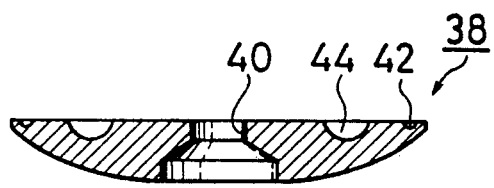
FIG. 4 is a section taken along line 4—4 of FIG. 3.

The present invention will be described in the following in connection with an embodiment thereof with reference to the accompanying drawings.

A first disc 30 has a circular shape, as viewed a top plan, and has its central portion formed with a needle 32 having a sharpened tip. Further formed are a first set of pins 34 having a smaller diameter, which are arranged in the circumferential portion, and a second sets of pins 36 having a larger diameter, which are arranged inside of the first set of pins 34. The sets of pins 34 and 36 are arrayed equidistantly in the individual circumferential directions and are also sharpened at their tips.

A second disc 38 also has a circular shape in a top plan view and has its central portion formed with a hole 40 acting as a fitting portion for fitting the aforementioned needle 32 therein. Further formed are a first circumferential groove 42, which is arranged to run in the circumferential edge, and a second circumferential groove 44 which is arranged to run between the hole 40 and the first circumferential groove 42. The radius of the first circumferential groove 42 is equal to that of the first set of pins 34 (i.e., the distance from the center of the needle 32 to the centers of the first set of pins 34). Likewise, the radius of the second circumferential groove 44 is equal to that of the second set of pins 36.

In the present embodiment, the diameter of the needle 32 is equal to that of the most constricted portion of the hole 40. On the other hand, the circumferential groove 42 has a width sized to receive the tips of the pins 34 snugly, and the circumferential groove 44 has a width sized to receive the tips of the pins 36 snugly.

The first and second discs 30 and 38 thus constructed are opposed, as shown in FIG. 5, to each other across the two faces of the webbing 14, and are then attached to each other by fitting the needle 32 in the hole 40 through the webbing 14. At this time, the pins 34 and 36 force the webbing 14 into the circumferential grooves 42 and 44 so that their tips bite into the texture of the webbing 14 until they enter the circumferential grooves 42 and 44. If the webbing 14 has a coarse texture, the tips of the pins 34 and 36 force their ways through the texture of the webbing 14 into the circumferential grooves 42 and 44.

Thus, a tongue plate stopper 46 is constructed to have its discs 30 and 38 attached to the webbing 14. In this construction, not only the needle 32 bites into the webbing 14, but also the numerous pins 34 and 36 bite into the texture of the webbing 14. In addition, the webbing 14 is partially forced into the circumferential grooves 42 and 44 by the pins 34 and 36. In these ways, the weight of the tongue plate applied to the tongue plate stopper 46 is dispersed over a wide range of the discs 30 and 38. As a result, no load is concentrated at the wefts running below the needle 32 to prevent the "constrictions" in the webbing 14. Thus, the strength of the tongue plate stopper 46 to the webbing 14 is enhanced especially in the longitudinal direction of the webbing 14.

Incidentally, the first circumferential groove 42 and the first pins 34 are arranged in the radially equal position with respect to the hole 40 and the needle 32 so that they can connect the discs 30 and 38 to each other irrespective of the circumferential positions of the same. Since, moreover, the needle 32 and the minimum diameter portion of the hole 40 have the equal radii, the needle 32 is fixedly fitted in the hole 40 while being prevented from coming out.

In the present invention, the discs 30 and 38 may preferably be made of a synthetic resin. In the foregoing embodiment, the fitting portion of the needle 32 is exemplified by the through hole 40 but can apparently be modified by a recess.

As has been described hereinbefore, the tongue plate stopper of the present invention can be freed from any constriction in the webbing when it is attached thereto. Moreover, the strength to attachment to the webbing is remarkably high.

What is claimed is:

1. A tongue plate stopper for a webbing comprising:
  a first disc having a first webbing side face, at least one needle formed on the first webbing side face to project from a central portion thereof, a first set of pins projecting from a circumferential edge of the first webbing side face to be circumferentially spaced apart from each other, and a second set of pins projecting from a middle portion between the needle and the circumferential edge to be circumferentially spaced apart from each other, and
  a second disc having a fitting portion with a hole, a second webbing side face, a first circumferential groove formed on the second webbing side face and extending in a circumferential direction at a radius substantially equal to that of the first set of pins, and a second circumferential groove formed on the second webbing side face and extending in a circumferential direction at a radius substantially equal to that of the second set of pins, said first and second set of pins, when the first and second discs are connected together with the webbing therebetween, biting the webbing and engaging at their tips with the first and second circumferential grooves, respectively.

2. A tongue plate stopper according to claim 1, wherein said needle is so sufficiently higher than said first and second sets of pins that it can be snugly fitted in the hole of said second disc to fix said first and second discs together.

3. A tongue plate stopper for a webbing comprising:
  a first disc having a first side face, at least one needle projecting from a central portion of the first side face, and at least one set of pins projecting from the first side face around the needle circumferentially spaced apart from each other, and
  a second disc having a second side face, at least one hole for receiving the needle, said hole being formed in a central portion of the second disc, and at least one circumferential groove formed on the second side face and extending in a circumferential direction at a radius substantially equal to that of the set of pins so that when the first and second discs are connected together with the webbing therebetween, the needle passes through the webbing and engages the hole to firmly engage the two discs together and the one set of pins bites the webbing and engages at their tips with the circumferential groove to thereby support weight of the tongue plate by wefts engaging the pins and the groove as well as the needle.

4. A tongue plate stopper according to claim 3, wherein said pins pass through the webbing and engage the groove when the two discs are connected together.

* * * * *